W. KELSO.
COUPLING CARRIER.
APPLICATION FILED MAR. 9, 1920.
1,362,706. Patented Dec. 21, 1920.
3 SHEETS—SHEET 2.
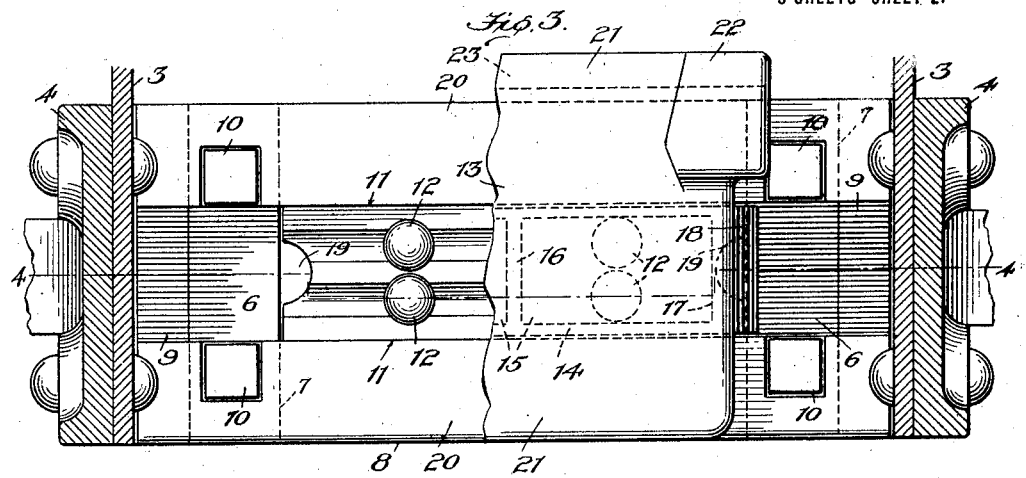
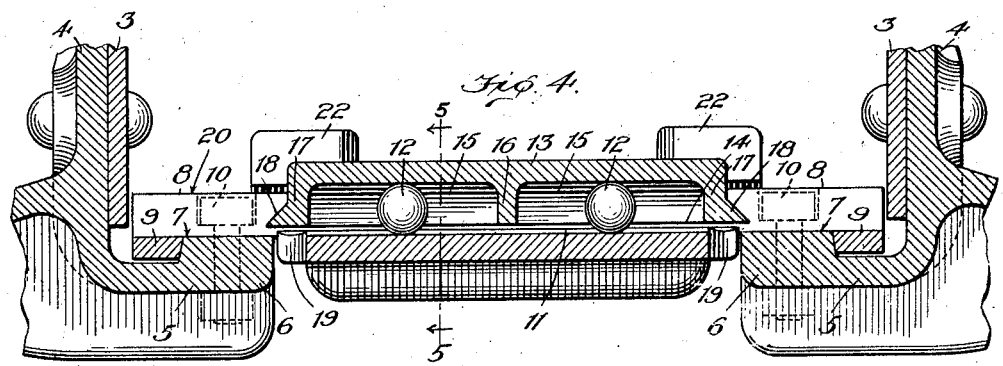
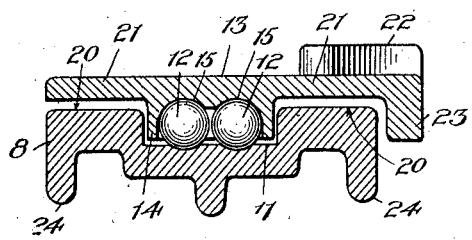
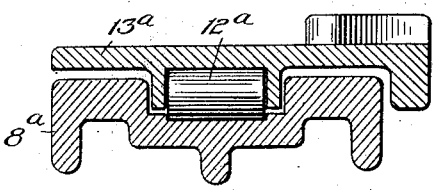
Witness
Edwin L. Bradford
Inventor
William Kelso
By Ritter & Ritter
his Attorneys W. KELSO.
COUPLING CARRIER.
APPLICATION FILED MAR. 9, 1920.
1,362,706.
Patented Dec. 21, 1920.
3 SHEETS—SHEET 3.
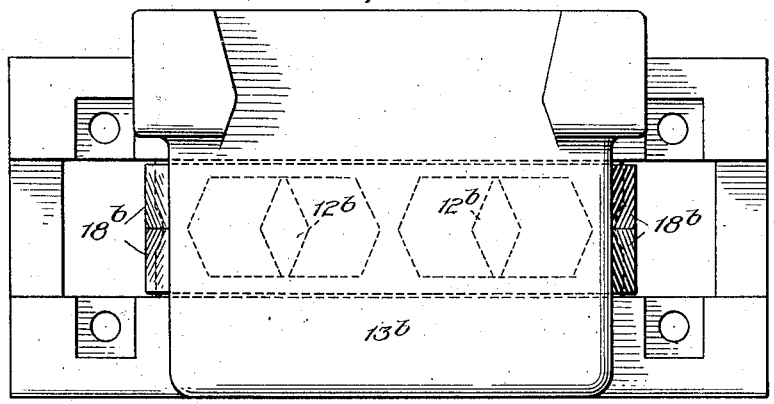
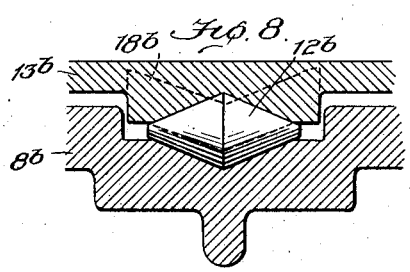 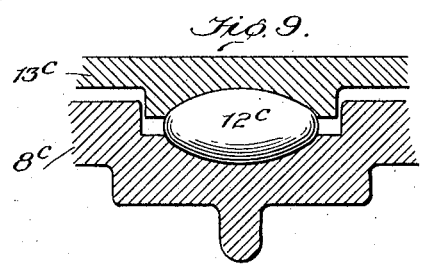
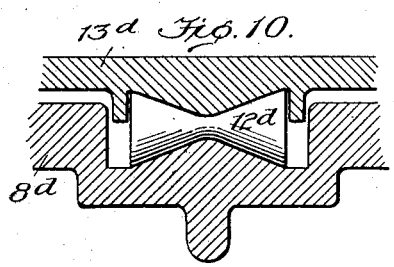 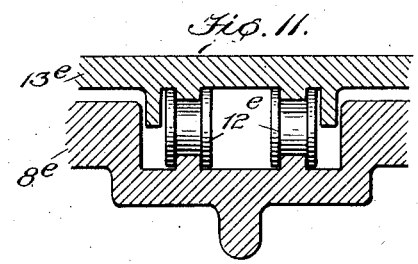
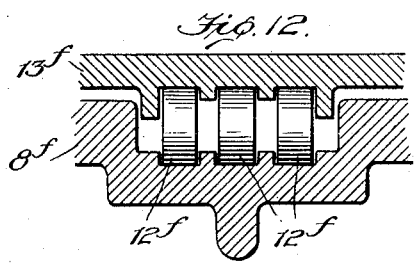 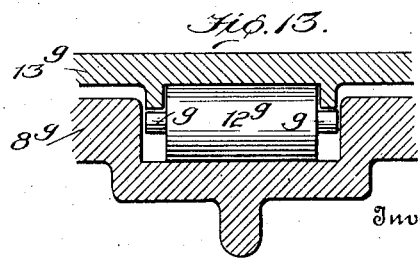
Witness
Edwin L. Bradford
Inventor
William Kelso
By Ritter & Ritter
his Attorneys

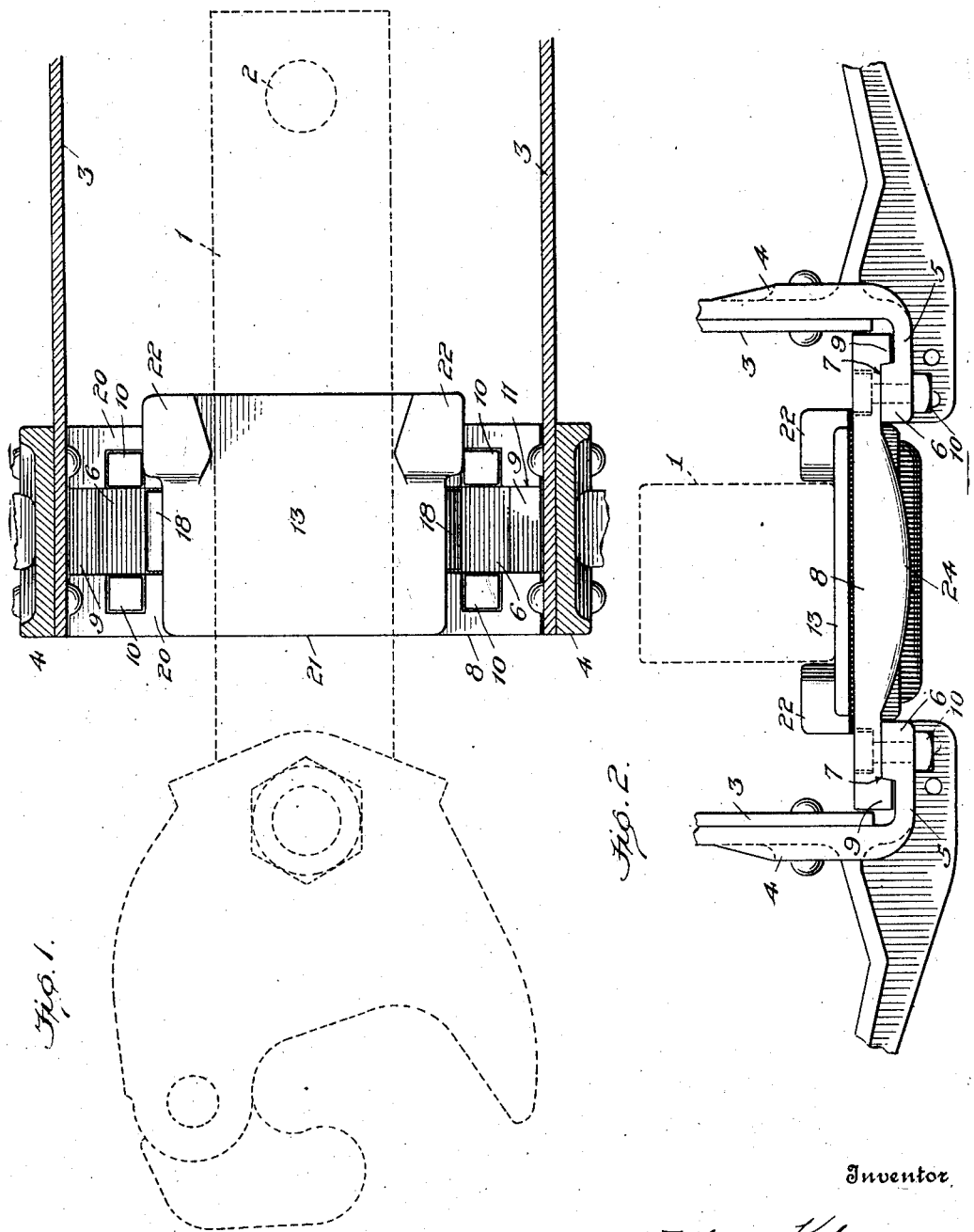

UNITED STATES PATENT OFFICE.

WILLIAM KELSO, OF PITTSBURGH, PENNSYLVANIA, ASSIGNOR TO THE McCONWAY & TORLEY COMPANY, OF PITTSBURGH, PENNSYLVANIA, A CORPORATION OF PENNSYLVANIA.

COUPLING-CARRIER.

1,362,706.

Specification of Letters Patent.  Patented Dec. 21, 1920.

Application filed March 9, 1920.  Serial No. 364,528.

*To all whom it may concern:*

Be it known that I, WILLIAM KELSO, a citizen of the United States, residing at Pittsburgh, in the county of Allegheny and State of Pennsylvania, have invented certain new and useful Improvements in Coupling-Carriers; and I do hereby declare the following to be a full, clear, and exact description of the invention, such as will enable others skilled in the art to which it appertains to make and use the same.

My invention relates to the construction of coupler carriers for supporting car couplers from the bodies of cars, and is designed to afford a carrier or carry iron which is especially well adapted for use on passenger cars equipped with couplers having an extended lateral swinging movement. The principal object of the invention is to provide a strong, durable and compact roller bearing carrier of relatively few parts. A further object of the invention is to so combine the elements of the carrier that they may be readily assembled and disassembled when occasion requires the renewal or repair of any part. A still further object of the invention is to so construct the mechanism that the antifriction roller devices thereof shall have a true rolling movement corresponding to the full extent of lateral swinging of the coupler from its normal position, and to insure automatically the proper positioning of the rollers.

In the drawings illustrating forms in which I contemplate applying the principle of my invention,—

Figure 1 is a plan view of a coupler carrier embodying the invention, the relation of a pivoted or swinging coupler thereto being shown in dotted lines and portions of the sills of the car and brackets for attaching the carrier to the sills being also illustrated.

Fig. 2 is a front elevation of the construction shown in Fig. 1.

Fig. 3 is a detail plan view, a portion of the transversely movable member which engages the coupler being broken away to disclose the antifriction rollers in the channel of the stationary base member of the carrier.

Fig. 4 is a section on the line 4—4, Fig. 3.

Fig. 5 is a section on the line 5—5, Fig. 4.

Fig. 6 is a view corresponding to Fig. 5 but illustrating a modified form of construction employing cylindrical rollers.

Fig. 7 is a detail plan view of a modified form of carrier employing another form of antifriction rollers.

Fig. 8 is a detail view in longitudinal section of the construction shown in Fig. 7.

Figs. 9, 10, 11, 12 and 13 are views corresponding to Fig. 8 but illustrating various other suitable forms of rollers.

In the drawings illustrating the invention, the scope whereof is pointed out in the claims, 1 indicates a car coupler of a well known type which is adapted to be pivotally connected to the yoke of a draft rigging by means of the usual tail pin (not shown) passing through the pivot opening 2 near the rear end of the coupler stem. The center sills or draft sills of the car are indicated by the numeral 3, while brackets 4, which are rigidly riveted to the sills 3, are illustrated as a suitable means for connecting the carrier device to the sills. These brackets, which are preferably employed for the purpose stated, are provided with inwardly extending shelves 5 having upwardly extending lugs 6 which enter corresponding longitudinally extending recesses or channels 7 in the under side of the base member 8 of the carrier. At its opposite ends the base member 8 is provided with longitudinally extending ribs 9 which project downwardly below the roller supporting face of said base member and are adapted to receive between them and respectively engage the upwardly projecting lugs 7 of the brackets 4. Bolts 10, which pass through the brackets 4 and the base member 8 and have their heads countersunk in the latter, preferably are employed for rigidly securing the base member in position.

The base 8 is provided with a centrally disposed channel 11 extending transversely of the car and preferably coextensive with the width of the carrier. A plurality of antifriction rollers 12 are seated in said channel, the roller supporting face of the latter being shaped to correspond to the form of the rollers employed so as to guide said rollers during their movements. Several forms of antifriction rollers are shown in the drawings; they may be of any shape so long as their vertical cross section parallel to their direction of travel is circular, as will be readily appreciated.

Superposed upon the rollers 12 is a transversely slidable member 13 which is adapted to engage the under surface of the stem of the coupler 1. This roller-supported transversely-movable member is provided with a downwardly extending portion 14 which projects into the channel 11 of the base member and which is formed with a plurality of recesses or channels 15 for receiving the rollers 12. The channels 15, which are parallel to the channel 11 in the base member, are separated from each other by a partition 16 and are closed at the ends by walls 17, each of said channels 15 being of a length not less than the maximum allowable movement of the transversely movable member 13 from its central position corresponding to the normal position of the coupler 1 in the longitudinal axis of the car. It will be perceived that by the use of the partition 16 separating the channels 15 one or two cross movements of the transversely movable member 13 will suffice, irrespective of their positions in the channels when first applied, to bring the rollers to proper positions enabling them thereafter to have a true rolling movement for any subsequent cross movements of the member 13, such rolling movements for the full extent of lateral displacement of which the member 13 is capable being also insured by making the individual channels 15 of proper length as heretofore described.

The downwardly projecting portion 14 of the coupler engaging member 13 is preferably of substantially the same width as the channel 11 in the base member 8 of the carrier, said projecting portion 14 thereby being enabled to interlock the member 13 with the base of the carrier so as to prevent displacement of the former when the coupler 1 slides back and forth in draft and buffing. In order to remove any dirt or ice which may accumulate in the channel 11, the outer faces of the end walls 17 of the downwardly projecting portion of the member 13 are preferably beveled outwardly and downwardly adjacent the roller supporting face of the channel to form plow members 18. To permit dirt or ice thus plowed off to escape from the channel 15 it is preferred to provide the latter with apertures 19 opening through the bottom of the channel.

On opposite sides of the channel 11 the base member 8 of the carrier is preferably formed with horizontally extending upper faces 20, and the transversely movable member 13 is likewise preferably formed on opposite sides of its downwardly extending portion 14 with horizontally extending plates or flanges 21 which overlap the said horizontal upper faces of the base member. At its rear end the movable member 13 of the carrier is provided with upwardly extending lugs 22 which are adapted to receive the coupler between them, the opposing faces of said lugs being, as shown, preferably beveled in order to allow the coupler 1 easily to assume an angular position with respect to the carrier. The lugs 22 may conveniently constitute means for limiting the transverse movement of the member 13. For this purpose they are extended laterally beyond the outer ends of the plow members 18, thereby preventing the latter from coming into contact with the sills 3 of the car. In order to increase the bearing area of the lugs 22 against the sills 3 as well as to strengthen the rear end of the movable member 13 of the carrier, the latter may be formed with a downwardly extending transverse rib 23 which vertically overlaps the rear face of the base member 8. The base member of the carrier is preferably provided with transversely extending downwardly projecting ribs or flanges 24 between which the channel portion of said base member is formed. The channel form of the base member 8 acts in conjunction with the flanges 24 to render the carrier exceedingly strong and stiff.

The modified construction shown in Fig. 6 employs rollers $12^a$ which are of cylindrical form. Except for changes in the configuration of the roller channels of the base member $8^a$ and transversely movable member $13^a$ necessary to make such channels coöperates with rollers of cylindrical form, this modification of the carrier is the same in construction as that illustrated in Figs. 1 to 5, inclusive, and heretofore described.

In the modified form of construction disclosed in Figs. 7 and 8 the rollers $12^b$, which are interposed between the base $8^b$ and the transversely movable member $13^b$, are of double conical form with a common circular base. The channels in the members $8^b$ and $13^b$ for the rollers $12^b$ are provided with inclined sides to afford extended bearings for the rollers. This modification of my invention also discloses plow members at opposite ends of the transversely movable member each consisting of two outwardly and downwardly beveled faces $18^b$ which slope toward each other. The form of carrier shown in these figures is otherwise the same in construction as that shown in the principal figures.

Fig. 9 illustrates a construction in which the anti-friction rollers $12^c$ are ellipsoids, $8^c$ being the base member of this carrier and $13^c$ the transversely movable member thereof. In Fig. 10 the rollers $12^d$ are formed as double conical members tapering toward the center, the base member $8^d$ and the transversely movable member $13^d$ of the carrier being respectively provided with channels configured to afford bearings for rollers of this form. The rollers $12^e$ shown in Fig. 11 are cylindrical and provided with circular guiding flanges at their ends; these are interposed between the base member $8^e$ and the transversely movable member 13ᵉ of the carrier and roll in suitably formed channels in said members. The carrier shown in Fig. 12 employs a plurality of small cylindrical rollers 12ᶠ having their axes parallel or in alinement, the base and the transversely movable member of the carrier being the parts 8ᶠ and 13ᶠ, respectively. The construction shown in Fig. 13 is substantially like that of Fig. 6 except that its cylindrical rollers 12ᵍ are provided at each end with small axial extensions g. The rollers 12ᵍ are interposed between the base 8ᵍ and the transversely movable member 13ᵍ of the carrier. Apart from differences in the configuration of the channels attendant upon the employment of the various forms of rollers 12ᶜ, 12ᵈ, 12ᵉ, 12ᶠ and 12ᵍ, the modified forms of carriers illustrated in Figs. 9, 10, 11, 12 and 13 may conform in detail to the construction shown in Figs. 1 to 5, inclusive, and already described.

I claim:—

1. A coupler carrier involving a base member adapted to extend transversely of a car and to be rigidly connected thereto, said base member being provided with a channel extending transversely of the car, a plurality of rollers in said channel, and a transversely extending member seated upon said rollers and movable in a horizontal plane, said horizontally movable member having a downwardly extending portion projecting into said channel and provided with a plurality of recesses adapted to receive said rollers.

2. A coupler carrier involving a base member adapted to extend transversely of a car and to be rigidly connected thereto through the instrumentality of brackets provided with inwardly extending shelves formed with upwardly projecting lugs, a transversely movable member, and rollers interposed between and engaging said base member and said transversely movable member, said base member being formed with a channel extending transversely of the car for receiving said rollers and being provided on its under side with recesses extending at an angle to said channel and adapted to receive the said upwardly projecting lugs.

3. A coupler carrier involving a base member adapted to extend transversely of a car and to be rigidly connected thereto through the instrumentality of brackets provided with inwardly extending shelves having upwardly projecting lugs, a transversely movable member, and rollers interposed between and engaging said base member and said transversely movable member, said base member being formed with a channel extending transversely of the car for receiving said rollers and being provided at its ends with ribs projecting downwardly below the roller supporting face of said channel and adapted to receive between them and respectively to engage the said upwardly projecting lugs.

4. A coupler carrier involving a base member adapted to be rigidly secured to a car and having a channel extending transversely of the car, rollers in said channel, and a transversely movable member having a downwardly extending portion projecting into said channel and recessed to receive said rollers, the opposite ends of said downwardly extending portion being divergently beveled downwardly adjacent the roller supporting face of said channel.

5. A coupler carrier involving a base member adapted to be rigidly secured to a car and having a centrally disposed channel extending transversely of the car, rollers in said channel, and a transversely movable member superposed upon said rollers, said base member having horizontal upper faces on opposite sides of said channel, said transversely movable member having a downwardly extending portion projecting into said channel and provided with a plurality of roller receiving recesses, and said transversely movable member being formed on opposite sides of its said downwardly extending portion with flanges overlapping the said horizontal upper faces of said base member.

6. A coupler carrier involving a base member adapted to be rigidly secured to a car and having a channel extending transversely of the car, rollers in said channel, and a transversely movable member seated upon said rollers, said transversely movable member having oppositely disposed plow portions entering said channel and having portions extending laterally beyond said plow portions and adapted to limit the movement of said transversely movable member with respect to said base member.

7. A coupler carrier involving a base member adapted to be rigidly secured to and having a channel extending transversely of a car, a plurality of rollers in said channel, and a transversely movable member seated upon said rollers, said transversely movable member having roller receiving channels arranged in a plurality of series extending parallel to each other and to the channel in said base member, each of said channels in said movable member being of a length not less than the maximum allowable movement of said transversely movable member from its central position.

In testimony whereof I affix my signature.

WILLIAM KELSO.